March 18, 1930.  C. E. LEE  1,751,243
VINE CROP SHOCKER
Filed May 2, 1927  4 Sheets-Sheet 1

Inventor:
Claude E. Lee
By Silas C. Sweet
Attorney

March 18, 1930. C. E. LEE 1,751,243
VINE CROP SHOCKER
Filed May 2, 1927 4 Sheets-Sheet 2

Inventor:
Claude E. Lee
By Silas C. Sweet
Attorney

March 18, 1930.  C. E. LEE  1,751,243
VINE CROP SHOCKER
Filed May 2, 1927  4 Sheets-Sheet 3

Inventor:
Claude E. Lee
By Silas C. Sweet
Attorney

Inventor:
Claude E. Lee
By Silas C. Sweet.
Attorney

Patented Mar. 18, 1930

1,751,243

UNITED STATES PATENT OFFICE

CLAUDE E. LEE, OF ADAMS COUNTY, COLORADO

VINE-CROP SHOCKER

Application filed May 2, 1927. Serial No. 188,161.

In the harvesting of vine crops, such as beans, peas and the like, it is a common practice to traverse the field to be harvested with a machine or apparatus that severs the vines from the roots and leaves the severed vines in windrows on the ground. Since it is difficult to gather up and load the crop from said windrows without loss of time and loss of crop through shattering, it has been found desirable to shock the crop preparatory to loading and transportation, such shocking being commonly done with forks by hand or by means of rakes that drag the vines over the ground with consequent crop loss, and it is the purpose of my invention to provide a machine that may be coupled and operated with the severing machine, or operated separately, to gather up the vine crop as deposited in the windrows and form said crop into shocks.

A further object of my invention is to provide a machine adapted for use in the harvesting of vine crops which gathers and lifts said crop from the ground and deposits said crop in the form of a shock at the will of the operator.

A further object of my invention is to provide a machine adapted for use in the harvesting of vine crops which includes gathering and elevating mechanism adjustable relative to the ground and carrying means operable for dumping at the will of the operator.

A further object of my invention is to provide a machine adapted for use in the harvesting of vine crops which is tractively driven, simple, light in weight, inexpensive and efficient.

My invention consists in the construction, arrangement and combination of elements hereinafter set forth, pointed out in my claims and illustrated by the accompanying drawings, in which—

Figure 1:
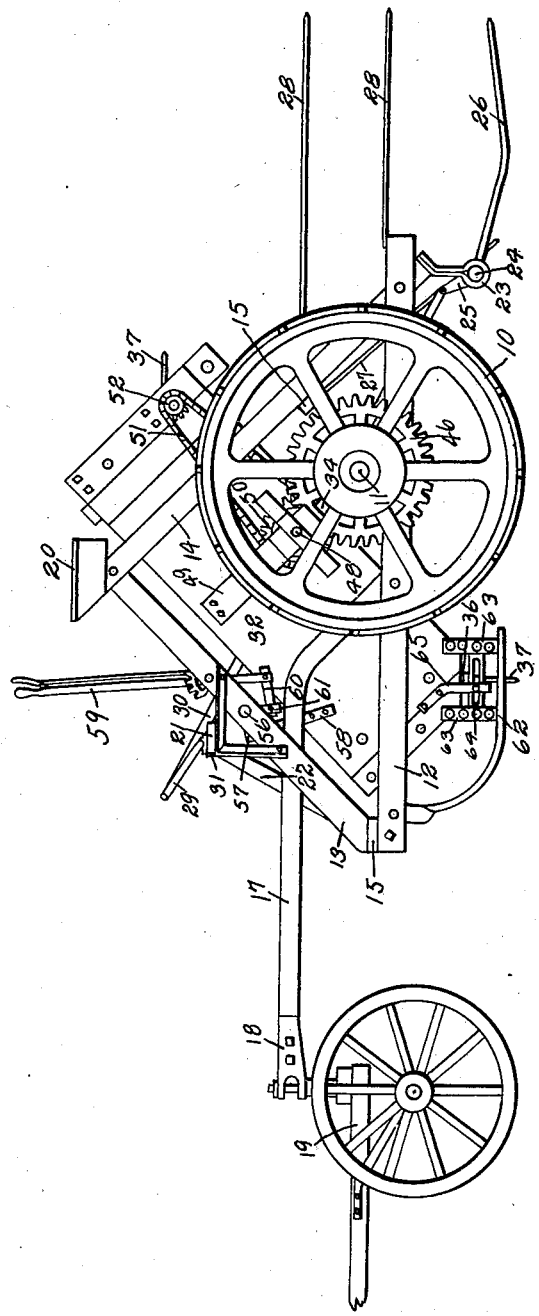
Figure 2:
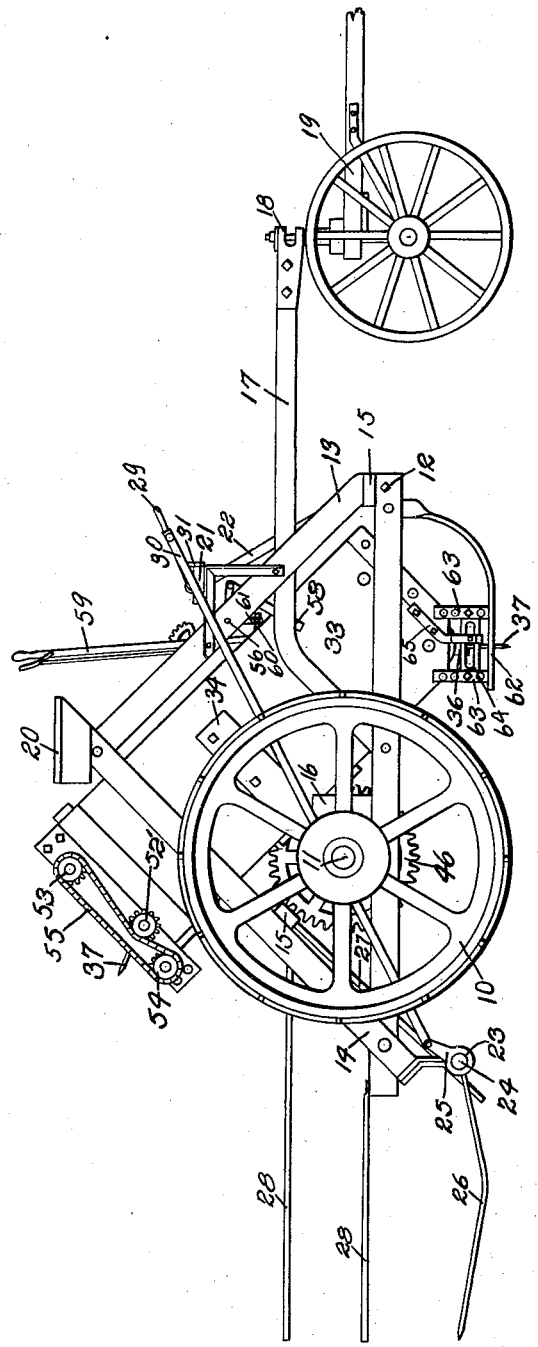
Figure 3:
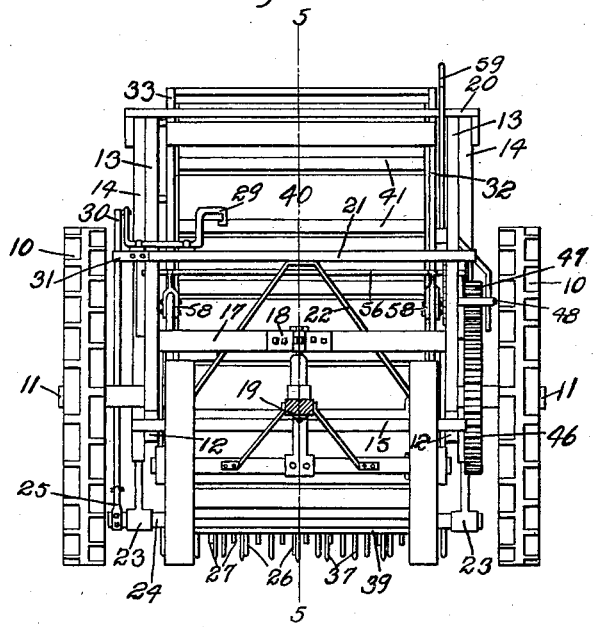
Figure 4:
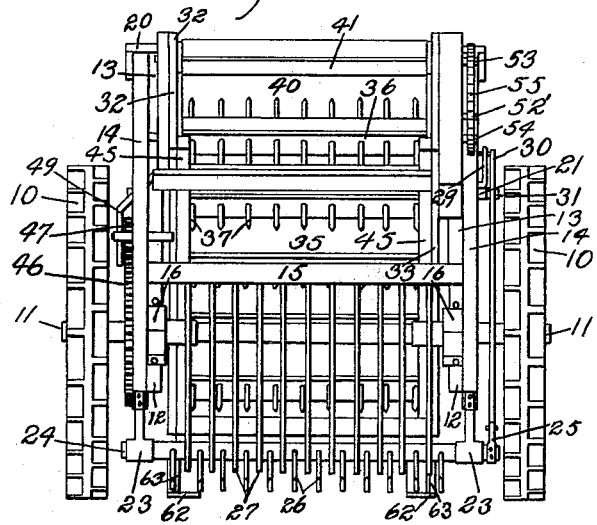
Figure 5:
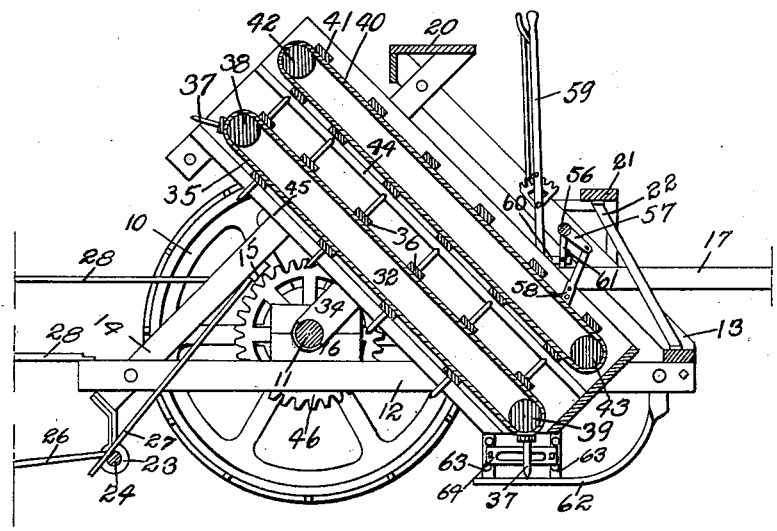
Figure 6:
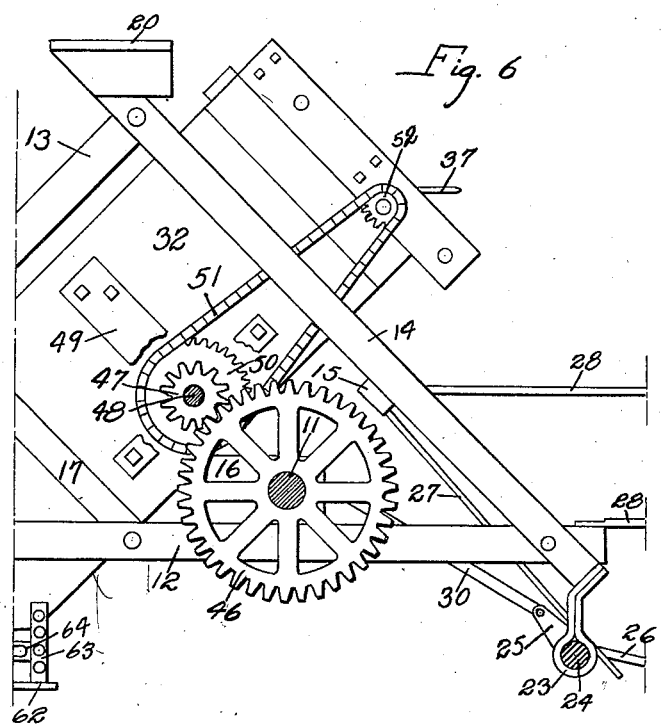

Figure 1 is an elevation of one side of the preferred construction of my machine. Figure 2 is a side elevation opposite to Figure 1. Figure 3 is a front end elevation of the construction shown in Figures 1 and 2. Figure 4 is a rear end elevation of the construction shown in Figures 1 and 2. Figure 5 is a vertical section on the indicated line 5—5 of Figure 3. Figure 6 is a fragmentary detailed elevation, partly in section, of the driving mechanism employed in the machine.

In the construction of the machine as shown, wheels 10 equipped with ground-engaging treads are spaced apart on and fixed to an axle 11. A skeleton frame is composed of similar, triangular side frames having each a horizontal base member 12 and upwardly-extending, inclined and converging members 13 and 14 secured to end portions of the member 12 at one end each and having their upper ends overlapped, said triangular frames being spaced apart and journaled on the axle 11 and rigidly braced by means of transverse braces 15. Split bearings or journals 16 are provided on the upper margin of each of the frame members 12 and so positioned as to mount the skeleton frame with the member 12 below the axle 11 and the major portion of the skeleton frame forward of said axle. A draw-bar yoke 17 is secured by its open end to members 12 and 13 of the skeleton frame and extends forwardly to converge and terminate in a clevis 18, which clevis may be connected to a tractor, harvesting machine, or the like (not shown), or may be pivotally connected with the king pin of a wheeled pole truck 19, as shown in the drawings. The brace connecting the apexes of the triangular frames is preferably relatively broad and flat, as indicated at 20, and provides a seat for the operator of the machine, a foot board 21 being bracket mounted on the inclined members 13 and diagonally braced to the members 12, as indicated at 22. Eyes 23 are secured to the rearmost lower ends of the members 14 and extend downwardly therefrom to receive and rotatably support the ends of a transverse shaft 24, one end of said shaft projecting beyond an eye 23 and having secured thereto a lever arm 25 which extends upwardly at right angles therefrom. Spaced, parallel rods or tines 26 are secured at one end in or to the shaft 24 and extend rearwardly therefrom in a plane normally slightly above the surface of the ground. One of the braces 15 is positioned transversely between the frame members 14 well above the horizontal members 12 and spaced, parallel rods 27 are fixed at one end in or to said brace and extend rearwardly and downwardly therefrom, their lower, free ends extending beyond and resting against the transverse shaft 24 between the tines 26. Other spaced, parallel rods 28 are fixed at one end to frame members 12 and 14 and extend in a horizontal direction rearwardly therefrom at either side of and above the tines 26. An operating pedal or lever 29, U-shaped in plan and having a lateral extension on one arm adapted to be engaged by the foot of the operator, is hinged to the foot board 21 adjacent one end thereof with the arms of the lever 29 extending forwardly and a pull rod 30 pivotally connects the forward end of the straight arm of said lever with the upper end of the lever arm 25, so that lifting of the lever 29 rotates the shaft 24 and permits the tines 26 to drop into engagement with the surface of the ground, at times, while forward pressure on said lever 29 rotates the shaft 24 forwardly and lifts the tines 26 away from the ground. A stop 31 is provided on the forward edge of the foot board 21, said stop being so positioned as to engage the edge of the pull rod 30 when said pull rod has passed below the hinge center of the lever 29 and thus hold the tines 26 in elevated position when the lifting pressure is removed from said lever. A conveyor box is mounted for oscillation on the axle 11, has two sides and both ends open and is formed of similar side members 32 and 33, spaced apart and suitably braced and connected. Plates 34, having each a bearing formed on its lower end, are secured to the side members 32 and 33, somewhat to the rear of the center of gravity of the conveyor box and the axle 11 is adapted to be received in the bearings of said plates, whereby said conveyor box is pivotally mounted on and carried by said axle, the major portion and weight of said box being forward of said axle which causes said box to assume an inclined position with its forward end lower than its rear end. An endless conveyor belt, or draper, 35, is provided with transverse slats 36 spaced apart along said belt, said slats carrying teeth or spikes 37, and said belt or draper is mounted on rollers 38 and 39 journaled in the side members 32 and 33 between and adjacent the lower side of said members, and a similar endless belt or draper 40 is provided with plain slats 41 and is mounted on rollers 42 and 43 between and adjacent the upper side of the members 32 and 33 and so spaced from the draper 35 as to permit the slats 41 to just clear the ends of the teeth 37. Strips 44 and 45 are preferably secured longitudinally of the inner faces of the side members 32 and 33 in such position as to engage the ends of the slats 36 and 41 and prevent sagging of the drapers. A relatively large gear 46 is fixed to the axle 11 adjacent one of the wheels 10 and said gear is adapted to mesh with a pinion 47 journaled on a shaft 48 carried by the side member 32. The shaft 48 has one end mounted in the side member 32 and its other end carried by a bracket 49 secured to said side member. A chain sprocket 50 is formed with or secured to the pinion 47 on the shaft 48 and an endless chain 51 drivingly connects a chain sprocket 52 on the projecting shaft of the roller 38 with the sprocket 50 and thereby is the draper 35 actuated by the traction of the machine so that the lower surface of said draper is caused to move forwardly in the direction of travel of said machine. The opposite end of the shaft of the roller 38 carries a chain sprocket 52' and a similar sprocket 53 is fixed to the corresponding end of the shaft of the roller 42, an idler sprocket 54 being carried by the side member 33 below the sprocket 52' and a chain 55 is passed about the sprockets 53 and 54 and in driving contact with one side of the sprocket 52', whereby the draper 40 is driven from the draper 35, but in an opposition direction. A shaft 56 is journaled transversely of the skeleton frame and extends through mid-portions of the members 13 and arms 57 are fixed to said shaft and extend forwardly above the upper margins of the side members 32 and 33 to which the forward ends of the arms 57 are connected by links 58. A hand lever 59 is equipped with the customary detent and quadrant and is mounted on one of the members 13 and has an extension below said member and the pivotal point of said lever, which extension is pivotally connected by means of a link 60 with the lower end of a downwardly extending arm 61 fixed to the end of the shaft 56. It is thus apparent that forward motion of the hand lever 59 would, through its connections, rotate the shaft 56 and arms 57 to depress or lower the forward end of the conveyor box; an opposite motion of the hand lever serving to lift the forward end of said box. To prevent undesirable digging in of the forward end of the conveyor box, shoes 62 are pivoted to the forward ends of the members 12 and extend rearwardly and downwardly below and at one side of said box. Spaced, vertical standards 63 are carried by each of said shoes near their rearward ends and a slotted horizontal member 64 is adjustably carried on and between said standards on each shoe. A bracket 65 is secured to each of the side members 32 and 33 and extends downwardly across the plane of the slotted member 64 and a pin in the lower end of each of said brackets is adapted to be slidingly received in the slot of said slotted member. Thus, if the shoes 62 strike clods, higher ground or the like, they are forced upwardly, carrying with them the forward end of the conveyor box, the sliding relation of the connections accommodating the eccentric relation between said shoes and box.

In the operation of my machine, the clevis 18 is attached to a harvesting machine, tractor or the like, or is positioned as shown on a pole truck and the machine is drawn through the field with the wheels 10 straddling the windrows of the severed crop. The conveyor box is positioned by means of the hand lever 59 so that the teeth 37 engage the surface of the ground and the tines 26 are maintained in elevated position. As the machine moves forward, the lower draper is fed forward and the teeth 37 pick up the vines from the ground and feed them rearwardly through the conveyor box whence they are discharged into and onto the carrier formed by the tines 26 and rods 27 and 28. The upper draper serves to hold the vines on the lower draper and assists in the rearward feeding. When the carrier is filled, or when the desired point is reached in the field, the carrier is tripped by lifting of the U-shaped lever 29, which permits the tines 26 to drop into engagement with the surface of the ground and be drawn out from under the load of vines. After the machine has cleared the shock so deposited, the tines are again lifted to elevated position and the operation as above set forth repeated.

It is obvious that various structural modifications of the specific construction illustrated are possible without departing from the spirit of my invention, hence I wish to be understood as being limited only by the scope of the appended claims.

I claim as my invention—

1. A machine for the shocking of vine crops comprising a wheel-supported axle, a skeleton frame carried by said axle, draft means on the forward end of said frame, a manually-operable dumping carrier on the rear end of said frame, a conveyor box mounted for oscillation on said axle within said frame, spaced, parallel opposed drapers mounted for opposite travel within said conveyor box and adapted to discharge on said carrier, driving connections between said axle and drapers and manually operable means on said frame whereby said conveyor may be oscillated relative to said axle; together with ground-contacting means hinged to the forward end of said frame and engaging said conveyor box whereby the latter may be raised and lowered in conformity with the contour of the ground.

2. In a machine for the shocking of vine crops having a wheel-supported axle, a skeleton frame carried by said axle, a manually-operable dumping carrier on the rear end of said frame, a conveyor box mounted for oscillation on said axle within said frame and driving connections between said axle and drapers within said conveyor box, manually-operable means for oscillating said conveyor box on said axle, said means comprising a hand lever pivotally mounted on said frame, a detent on said lever, a quadrant on said frame adapted to be engaged by said detent, a shaft pivotally mounted transversely of said frame above said conveyor box, laterally-projecting arms fixed to said shaft, links connecting said arms with side members of said conveyor box, an arm fixed to one end of said shaft and a link connecting said latter arm with said hand lever.

3. In a machine for the shocking of vine crops having a wheel-supported axle, a skeleton frame carried by said axle and a conveyor box mounted for oscillation on said axle within said frame, means for automatically lifting the lower end of said conveyor box over ridges and high spots in a field, said means comprising shoes pivotally secured to, depending from and extending rearwardly beneath said frame, spaced standards on each of said shoes and adjacent the rear end thereof, slotted bars adjustably supported by and between each pair of standards, brackets on and depending from said conveyor box on either side and adjacent said slotted bars and pins in the lower ends of said brackets and adapted to be slidingly engaged in the slots of said bars.

Signed at Denver, in the county of Denver and State of Colorado, this 25th day of April, 1927.

CLAUDE E. LEE.